Patented Mar. 25, 1941

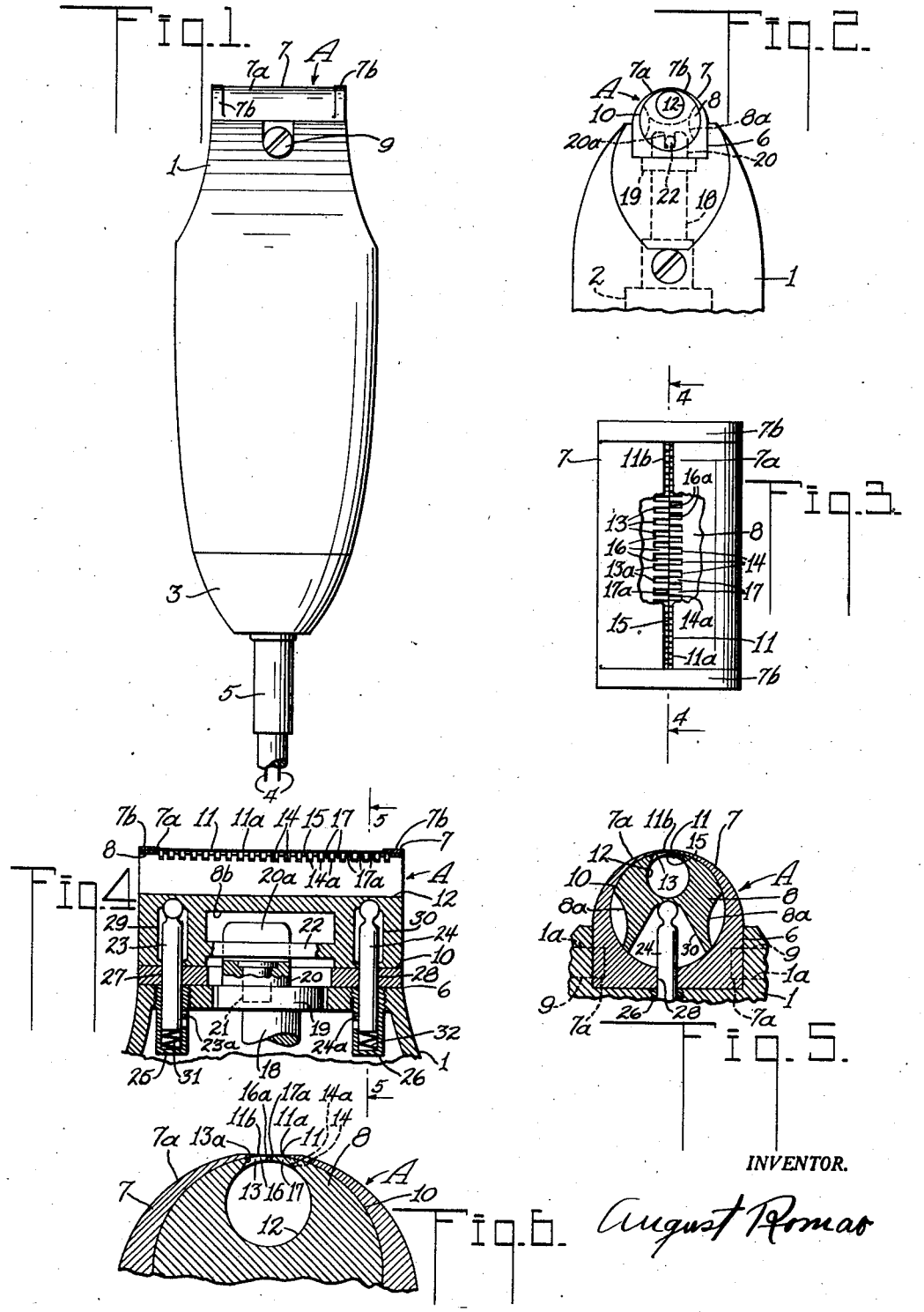

2,236,159

UNITED STATES PATENT OFFICE 2,236,159

ELECTRIC DRY SHAVER

August Romao, San Francisco, Calif.

Application January 13, 1939, Serial No. 250,716

6 Claims. (Cl. 30—43)

My invention relates to improvements in an electric dry shaver, and it consists of the combinations, constructions and arrangements hereinafter described and claimed.

The electric shavers of which I am aware make use of a transversely slotted shear plate that rests against the face and a cutter operating under the plate to cut the hairs. The shearing action takes place close to the surface of the skin because the shearing plate is extremely thin and the plate is held against flexing under inward pressure by the cutter which supports it. The slots in the plate receive the hair and these slots cooperate with slots in the cutter to sever the hair when the cutter is reciprocated in a direction transverse to the length of the slots.

The disadvantage of such a shaver lies in the fact that there is no unbroken cutting line extending from end to end of the clipper head at any one time. The bars defining the slots in the shear plate prevent hairs, momentarily underlying the bars, from being cut. This necessitates a repeated forward and back movement of the device over all parts of the face in order to cut all of the hair. The uncut hairs will space the shearing plate from the face and prevent a close cut being made during the initial movement of the device over the face. Even after all of the hair has been cut, the thickness of the shearing plate although extremely thin, prevents a close shave being made because the hairs after being cut, will have a length at least equal to the thickness of the shearing plate.

The principal object of my invention is to provide an electric dry shaver in which the clipper head has a shearing plate or guard provided with a slot that extends substantially from end to end of the guard. The sides of the slot are sharpened to act as cutting edges that extend in an unbroken line across the length of the guard. Under the slot, I rotatably mount a cylindrical cutter. This cutter has transversely extending slots alternately disposed on opposite sides of a medial line that is coextensive with the shearing plate slot. Both ends of the slots paralleling the guard slot cutting edges are provided with cutting edges and these edges cooperate with the guard slot edges for severing hair received in the transverse slots. The cutter is rocked on its axis through an arc large enough to cause both rows of cutter slots to pass under the guard slot when the cutter is rocked in one direction and to repeat the operation when the cutter is rocked in a reverse direction. A simple, motor-actuated means is used for rocking the cutter in both directions about its axis.

The cutter not only cooperates with the guard slot for clipping the hair, but the bars forming the slots, act as a support for the skin portion that is received in the guard slot. In this way, the skin is prevented from entering the cutter slots. The outer ends of one row of bars and the rear edges of the slots formed by the bars, provide a staggered cutting edge that is coextensive with the guard slot and cooperates with one edge of the slot to cut hair when the cutter is rocked in one direction. In like manner, the outer ends of the other row of bars and the rear edges of the other row of slots formed by the bars, provide a second staggered cutting edge that is coextensive with the other edge of the guard slot and cooperates therewith in cutting hair when the cutter is rocked in the opposite direction. The cutter is oscillated rapidly enough to cause each staggered cutting edge to in effect be equivalent to a straight edge. Two cutting edges are therefore provided having a length equal to the length of the guard slot, and the resulting clipping effect will prove as effective as a razor blade because the cutting is accomplished on the surface of the skin.

Additional objects will likely be set forth in the following description and the invention is clearly illustrated in the accompanying drawing, in which Figure 1 is a front elevation of the device;

Figure 2 is a side elevation of the clipping end of the device;

Figure 3 is a top plan view of the clipper head on an enlarged scale;

Figure 4 is a section substantially along the line 4—4 of Figure 3;

Figure 5 is a section substantially along the line 5—5 of Figure 4; and

Figure 6 is a transverse section of the clipper head on still a larger scale.

In carrying out my invention, I provide a casing 1 designed to hold a motor indicated generally at 2 in Figure 2. The motor may be of any type desired such as a universal one that will operate on direct or alternating current. If desired, the end portion 3 of the casing may constitute a switch handle that may be turned for connecting the motor to or disconnecting it from a source of current. Wires 4 are carried in a cable 5 and may be connected to the house current in the usual manner, not shown.

Figures 2 and 5 show the casing 1 provided with a recess 6 for removably receiving a clipper head assembly indicated generally at A. The assembly consists of a shearing plate or guard 7 and a cutter 8. The guard preferably has a rectangular base received in the recess and has threaded openings 7a for receiving screws 9 used for removably securing the guard to the casing. The screws extend through openings 1a in the casing.

The outer end of the guard is rounded into a substantially semi-cylindrical shape as at 7a' and an eccentric cylindrical bore 10 extends through the guard. This bore extends very close to the center of the rounded portion 7a' so that the thickness of the guard wall at this point is extremely thin. A longitudinal slot 11 is cut lengthwise in the guard at the thinnest portion of the wall and this slot extends substantially from end to end of the guard. The guard has reinforcing ribs 7b at each end that close the ends of the slot 11. Figure 6 illustrates how the two edges of the slot are sharpened at 11a and 11b to practically a razor-like cutting edge.

Within the bore 10, I rotatably mount the cylindrical cutter 8, and this cutter has a diameter equal to the diameter of the bore. The cutter closes the slot 11 from the underside and the cutting edges of the slot contact with the cutter. Figures 5 and 6 clearly show how the cutter has an eccentric bore 12 that extends from end to end of the cutter and is disposed close to the outer surface so as to provide a very thin cutter wall. This thin wall is provided with two rows of transversely extending slots 13 and 14 arranged in staggered relation on opposite sides of a median cut 15. The cut is disposed midway between the sides of the slot 11 when the cutter is in its central position. The slots 13 are separated from each other by bars or fingers 16 and in like manner the slots 14 are separated by bars or fingers 17. The outer ends of the bars 16 close the outer ends of the slots 14 while the outer ends of the bars 17 close the outer ends of the slots 13.

The cutter 8 cooperates with the guard 7 in cutting the hair in the following manner. The outer ends 16a of the bars 16 are sharpened and the inner ends 13a of the slots 13 are likewise sharpened to provide a staggered cutting edge that is coextensive with the slot 11. This staggered cutting edge is moved past the cutting edge 11a of the slot 11 when the cutter is rocked in a clockwise direction when viewing Figures 5 and 6. Any hair received in the slot 11 and slots 14 and 13 will be severed during this movement, the cutting edges 16a cooperating with the edge 11a to cut the hair in the slots 14 and the cutting edges 13a cooperating with the same cutting edge 11a to cut the hair in the slots 13. The rocking movement of the cutter is so rapid as to in effect cause the staggered cutting edge formed from the edges 16a and 13a to constitute a single cutting edge that is coextensive with the edge 11a.

When the cutter is rocked in the opposite direction, the cutting edges 17a formed at the outer ends of the bars 17 and the cutting edges 14a formed at the rear of the slots 14 will cooperate with the cutting edge 11b of the slot 11 to cut hair received in the slots 13 and 14. The cutting edges 17a and 14a will form a staggered cutting edge coextensive with the cutting edge 11b. The cutter 8 as it is reciprocated in both directions will cut hair for each reversal of movement. This is especially advantageous to cutting beard that might be growing at different angular positions from the face. The bars 16 and 17 will act as a secondary guard for preventing the skin from entering the transverse slots while permitting the device to make successive cutting strokes in opposite directions across the entire length of the guard 7 for clipping the hair close to the face.

Any means for reciprocating the cutter may be used. I have shown the universal motor 2 with its shaft 18 carrying a disc 19 on which a clevis 20 is eccentrically and pivotally connected at 21. The cutter 8 has a longitudinal bar 22 slidably receivable in the slot 20a of the clevis. When the motor is operated, the clevis will be swung in a small circle by the pin 21 and will impart an oscillatory movement to the cutter through the medium of the pin 22. The pin is swung sufficiently in both directions lateral to its length to cause the slots 13 and 14 to completely pass under the edge 11a when moving in one direction and then under the edge 11b when moving in the other direction.

I also provide means for holding the cutter against longitudinal movement in the guard and for yieldingly holding the cutter against the portion of the guard wall that is slotted. The cutter will therefore automatically sharpen itself and also the edges 11a and 11b will be sharpened while the cutter is being reciprocated. Spring-pressed plungers 23 and 24, shown in Figures 4 and 5, are carried in housings 25 and 26 that are screwed into the casing 1. The plungers extend through openings 27 and 28 in the base of the guard 7 and up into sector-shaped recesses 29 and 30 in the underside of the cutter 8. The upper ends of the plungers are spherical-shaped and their centers lie in the axis of the cutter. The innermost portions of the recesses 29 and 30 are spherical-shaped to rockably receive the spherical ends of the rods. Springs 31 and 32, mounted in the closed ends of the housings 25 and 26 urge the plungers against the cutter.

It will be apparent from the foregoing description that the operation of the device will be simply performed. Figure 6 shows the cutting edges 13a, 14a, 16a and 17a extending at an angle so that a continuously sharp edge will be presented as the outer surface of the cutter wears through use. The razor-sharp edges 11a and 11b are likewise kept continually sharpened by the cutter.

When using the device, the switch 3 is closed for connecting the motor 2 to a source of current. The cutter will be oscillated and the guard 7 will be held against the face so that the slot 11 will receive the hair. The bars 16 and 17 prevent the skin from becoming caught between the cutting edges of the cutter and guard. The slots 13 and 14 receive the hair and the cutting edges 13a, 14a, 16a and 17a cooperate with the slot edges 11a and 11b to cut the hair.

The principal novelty of the invention is the continuous cutting edge provided along the entire length of the guard and cutter. In fact two cutting edges are provided on the cutter and two on the guard so that a rapid rocking motion of the guard will cause the hair to be cut from two opposite directions. This will provide a clean cut the first time the guard is moved over the face because all of the hair received in the slot 11 will be received in the slots 13 and 14 and severed by the cutting edges. A close shave will result, due to the fact that the cutting action takes place adjacent to the surface of the skin. The slot 11 is made narrow enough to reduce the friction on the skin from the cutter 8 to a minimum.

The cut hair will enter the bore 12 and will fall from the ends of the bore by gravity or it may be removed by a brush. The cutter 8 may be made of two equal parts separated along the median line 15 and secured together. The cutter has cut away portions 8a to reduce the weight and friction and is provided with a recess at 8b to receive the eccentric clevis 20. The sector-shaped recesses 29 and 30 have the greater portions of their side walls spaced from the plungers to reduce friction.

In removing the head from the casing, the screws 9 are first removed and then the guard 7 is lifted from the casing recess 6. Stops 23a and 24a carried by the plungers 23 and 24, hold the plungers against removal with the guard. The cutter can be removed from the guard as soon as the plungers free the cutter. While I have shown only one form of my invention, I wish the inventive feature to include any guard with a slot therein and a cutter with staggered cutting edges coextensive with the slot for cutting hair, but preventing the skin from being cut.

While I have shown only the preferred form of my invention, it should be understood that various changes or modifications may be made within the scope of the appended claims without departing from the spirit of the invention.

I claim:

1. An electric dry shaver comprising a casing, a head carried thereby and including a guard and a cutter, the guard having a bore extending longitudinally therethrough and providing a thin wall portion with a slot extending substantially from end to end thereof, the sides of the slot constituting two cutting edges, the cutter being rotatably mounted in the bore and having two rows of transversely extending slots, alternately arranged on opposite sides of a median line, said slots defining two rows of fingers, the fingers in one row being staggered with respect to the fingers in the other so that the outer ends of the fingers in one row act as closures for the slots in the row on the opposite side of the median line and vice versa, the ends of the fingers and the rear walls of the slots being sharpened and constituting two staggered cutting edges coextensive with the slot, and means for rapidly rocking said cutter for alternately moving both rows of slots and fingers past each cutting edge of the guard slot, whereby the hair received in the two rows of transverse slots will be cut.

2. In an electric dry shaver, a guard adapted to contact with the skin and having a longitudinally extending slot for receiving the hair, said slot having its two sides constituting cutting edges, a cutter having two sets of staggered cutting edges arranged parallel with the guard cutting edges, each set constituting a continuous cutting edge coextensive with the slot, and means for reciprocating the cutter for causing one of its cutting edges to cooperate with one edge of the slot to cut hair along the entire length of the slot, when the cutter is moved in one direction and to cause its other cutting edge to cooperate with the other slot edge to cut hair along the entire length of the slot, when the cutter is moved in the reverse direction.

3. In an electric dry shaver, a guard having a hair-receiving slot extending substantially throughout the length of the guard, said guard having a bore forming cutting edges on the two longitudinal sides of the slot, a cutter mounted in the bore, said cutter having two rows of transversely extending slots, each row being coextensive with the length of the guard slot, the slots in one row alternating with the slots in the other row, said slots in each row being separated by fingers, the outer ends of the fingers and the rear edges of the transverse slots being sharpened for providing two cutting edges formed of sectional cutting portions, these cutting edges being coextensive with the guard slot and the cutting edges on the free ends of the fingers being substantially in alignment with each other, and means for reciprocating the cutter for causing its cutting edges to cooperate with the guard cutting edges to cut all of the hair in the guard slot for each reversal of the cutter.

4. In an electric shaver, a guard having a hair receiving slot extending substantially from end to end thereof, said guard having a bore communicating with the slot to form cutting edges along the two sides of the slot, a cutter mounted in the bore and having two rows of laterally extending fingers, the fingers forming two rows of recesses, the fingers in one row facing the fingers in the other and acting as closures for the open ends of the recesses in the opposite row, the ends of the fingers and the inner ends of the recesses forming two cutting edges coextensive with the cutting edges of the guard slot, each of said cutting edges on the cutter being formed of staggered sections, and means for reciprocating the cutter for causing the cutting edges on the cutter and guard to cut hair received in the slot and recesses, the fingers forming a protecting barrier for preventing the skin from entering the cutter recesses.

5. An electric dry shaver comprising a guard having a longitudinally extending slot with two sharpened edges extending in the direction of the guard length, a cutter movably mounted in the guard, two cutting edges on the cutter paralleling the guard slot and being coextensive therewith, one edge cooperating with one cutting edge of the slot when the cutter is moved in one direction to cause the two edges to move past each other, and the other cutting edge cooperating with the other cutting edge of the slot when the cutter is moved in the opposite direction, said cutter having transversely extending slots associated with the cutter cutting edges for receiving hair that is received in the guard slot, skin supporting fingers forming the cutter slots and preventing the skin from being caught between the cutting edges on the cutter and the guard cutting edges, and means for reciprocating the cutter for cutting all of the hair received in the guard slot, whereby a continuous shaving action is performed coextensive with the guard slot.

6. An electric dry shaver comprising a guard having a bore extending longitudinally therethrough and providing a thin wall portion with a longitudinal slot therein, the sides of the slot constituting two cutting edges, a cutter mounted in the bore and having two rows of transversely extending slots, alternately arranged on opposite sides of a median line, said slots defining two rows of fingers, the fingers in one row being staggered with respect to the fingers in the other so that the outer ends of the fingers in one row act as closures for the slots in the row on the opposite side of the median line and vice versa, the ends of the fingers and the rear walls of the slots constituting two staggered cutting edges coextensive with the slot, and means for reciprocating said cutter for alternately moving both rows of slots and fingers past each cutting edge of the guard slot for cutting all of the hair received in the guard slot and the two rows of transverse cutter slots.

AUGUST ROMAO.